(12) United States Patent
Vodanovic

(10) Patent No.: US 6,885,400 B1
(45) Date of Patent: Apr. 26, 2005

(54) CCD IMAGING DEVICE AND METHOD FOR HIGH SPEED PROFILING

(76) Inventor: Bojko Vodanovic, 86 Midland Avenue, Beaconsfield, Quebec (CA), H9W 4P1

( * ) Notice: Subject to any disclaimer, the term of this patent is extended or adjusted under 35 U.S.C. 154(b) by 0 days.

(21) Appl. No.: 09/522,819

(22) Filed: Mar. 10, 2000

Related U.S. Application Data

(63) Continuation-in-part of application No. 08/922,026, filed on Sep. 2, 1997, now Pat. No. 6,335,757.

(51) Int. Cl.[7] .................................................. H04N 3/14
(52) U.S. Cl. ...................... 348/311; 348/317; 348/320
(58) Field of Search ................................. 348/311, 312, 348/317, 319, 320, 322; 250/208.1

(56) References Cited

U.S. PATENT DOCUMENTS

| | | |
|---|---|---|
| 4,162,126 A | 7/1979 | Nakayawa et al. |
| 4,238,147 A | 12/1980 | Stern |
| 4,322,752 A | 3/1982 | Bixby |
| 4,330,796 A | 5/1982 | Anagnostopoulos et al. |
| 4,573,076 A | 2/1986 | Tisue et al. |
| 4,769,552 A | 9/1988 | Boue et al. |
| 4,799,108 A | 1/1989 | Gerner |
| 4,851,914 A * | 7/1989 | Pfanhouser et al. ........ 348/319 |
| 5,036,397 A | 7/1991 | Nagabusa |
| 5,083,867 A | 1/1992 | Burk |
| 5,144,445 A | 9/1992 | Higashitsutsumi |
| 5,177,556 A | 1/1993 | Rioux |
| 5,237,422 A | 8/1993 | Kannegundla |
| 5,264,678 A | 11/1993 | Powell et al. |
| 5,298,734 A * | 3/1994 | Kokubo ................... 250/208.1 |
| 5,353,057 A | 10/1994 | Watanabe |
| 5,406,372 A | 4/1995 | Vodanovic et al. |
| 5,420,629 A | 5/1995 | Watanabe |
| 5,459,510 A | 10/1995 | Hamalainen |
| 5,546,127 A * | 8/1996 | Yamashita et al. .......... 348/322 |
| 5,572,256 A * | 11/1996 | Egawa et al. ............... 348/312 |
| 5,636,023 A | 6/1997 | Yanagisawa |
| 5,668,631 A | 9/1997 | Norita et al. |
| 5,923,370 A * | 7/1999 | Miethig et al. ............. 348/320 |

* cited by examiner

Primary Examiner—Aung Moe
Assistant Examiner—Luong T. Nguyen
(74) Attorney, Agent, or Firm—Alexandra Daoud; Ogilvy Renault

(57) ABSTRACT

The present invention provides a method and apparatus for increasing the frame acquisition rate of an frame transfer CCD sensor by triggering the charge transfer signal TR, which controls the shift of the electrical charges from the light-sensitive cells into the vertical shift register, more than once per frame period, so that more than one image is acquired in the same frame, one above the other. The apparatus is used primarily for surface geometry inspection of high-speed moving objects, wherein acquired CCD images are thin, substantially horizontal profile lines.

15 Claims, 8 Drawing Sheets

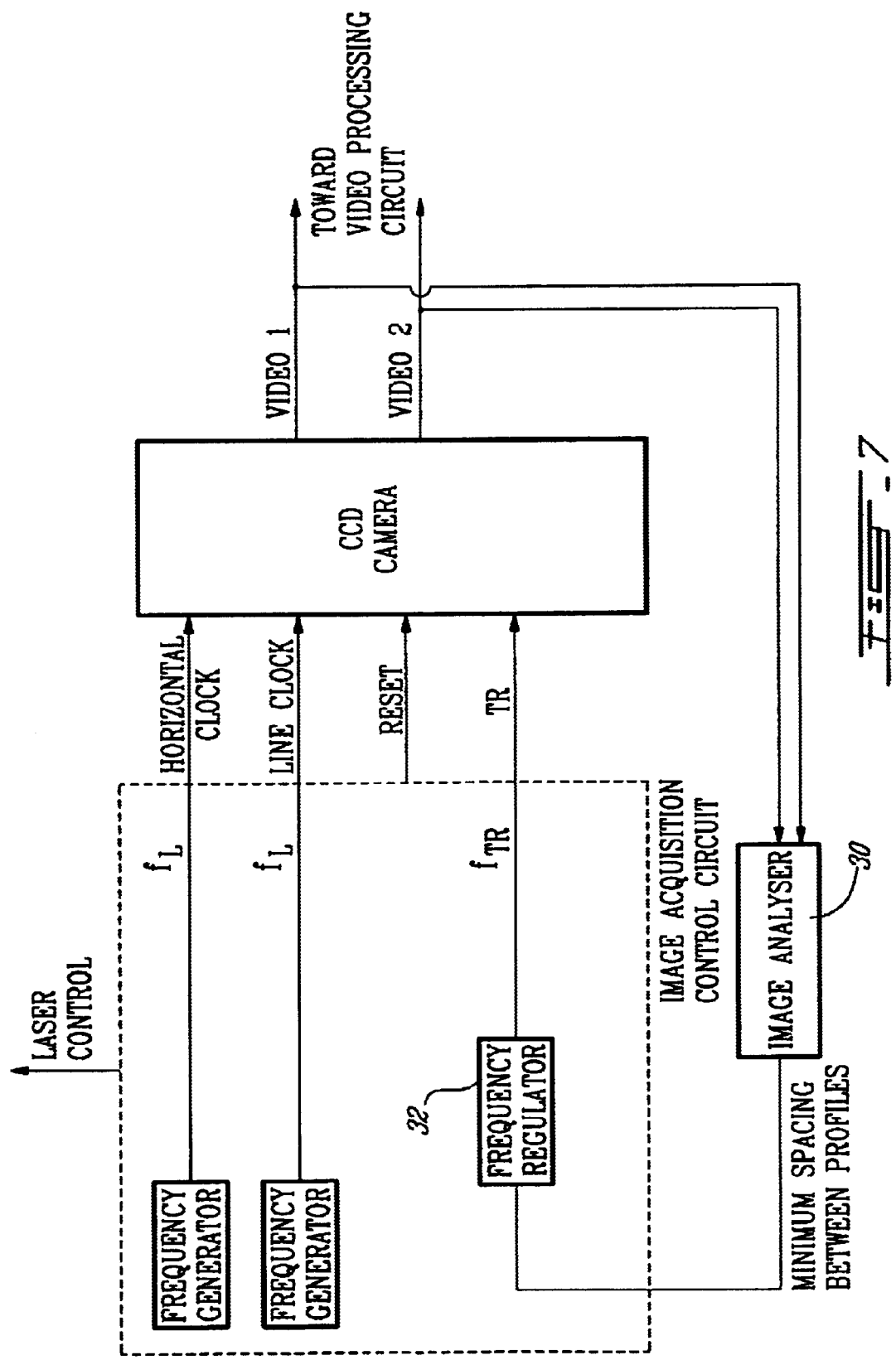

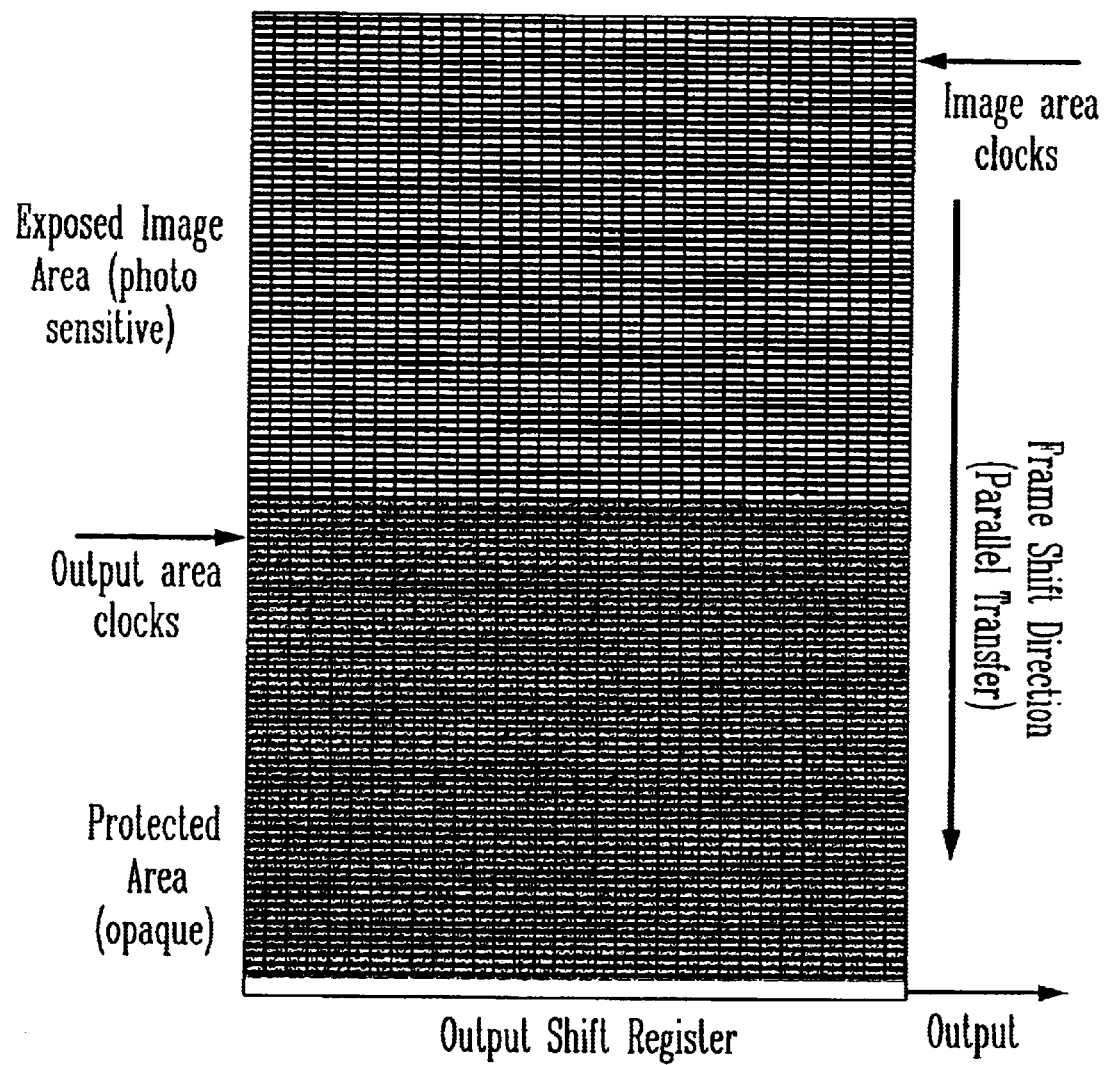

CCD IMAGING DEVICE AND METHOD FOR HIGH SPEED PROFILING

The present application is a continuation-in-part of U.S. patent application Ser. No. 08/922,026 filed Sep. 2, 1997, now U.S. Pat. No. 6,335,757.

FIELD OF THE INVENTION

The present invention relates to 2D image sensors and, more particularly, to an interline or frame transfer type image sensing method and apparatus used for readout of a CCD array image sensor at fast frame rates useful for high speed object profiling and surface geometry measurements.

BACKGROUND OF THE INVENTION

A typical solid-state imaging sensor device is composed of a charge-integrating photosites arranged in rows and columns. Each photosite responds to incident radiation by providing an electrical signal corresponding to one pixel of frame information. In the interline transfer type, charge is transferred out at once into a parallel structure of vertical shift registers. First, a charge pattern is accumulated at integration sites during image acquisition period, then the charge pattern is transferred into storage columns, also known as vertical shift registers. The transferred charges are then shifted one line at a time, into a horizontal readout register from which a line-by-line 2D video output signal is taken. This is known in the prior art and commonly allows taking pictures at a frame rate of about 30 frame per second.

Also known in the prior art is the use of such CCD cameras in acquiring profiles of objects for surface geometry inspection and measurements of relatively small objects. This is done by illuminating the surface of the object by an incident high energy light plan usually coming from a laser, and capturing the reflected light on the CCD image sensor array. Then, the acquired profile of the object can be isolated for shape or surface geometry inspection of the object. A limitation of the known technique comes from the fact that when many surface portions have to be inspected in a short period of time (e.g., on a assembly-line) the standard frame rate of the CCDs is no longer sufficient, because the known method allows inspecting at most one profile per frame period per CCD camera. Various improvements to the known technique are disclosed in U.S. Pat. No. 4,162,126 to Nakayama et al., U.S. Pat. No. 5,083,867 to David Burk and U.S. Pat. No. 5,177,556 to Marc Rioux.

There are also other prior U.S. patents that allow improvements concerning the frame rate being read from a CCD sensor. This is done by formatting the area sensor into blocks of photosites so that fewer sectors have to be read (e.g. U.S. Pat. No. 4,322,752 to James Bixby) or by adding adjacent pixel charges to improve at the same time the acquisition frame rate and the dynamic range of the image (e.g. U.S. Pat. No. 5,420,629 to Takashi Watanabe). None of these prior patents allow a standard interline transfer CCD to be used having an improvement of a factor greater than 4 over the standard read rate and, when there is improvement, this is done at the expense of detail or quality of the captured image.

SUMMARY OF THE INVENTION

In accordance with the present invention, method and apparatus are provided for reading out information from a solid-state image sensor in a fraction of the time that would be required using a known interline transfer CCD sensor for surface geometry inspection or object profiling. Further, according with the present invention, improvement of a factor of 50 is possible over the standard read rate of a CCD area sensor for such particular applications.

According to a broad aspect of the present invention the charge transfer signal TR, which controls the transfer of the accumulated electrical charges from CCD's photosites into the vertical shift register is triggered more than once per frame period (e.g. n times per frame period, when n is a value greater than one, while in the prior art method n was always less or equal to one), and this results in a conventionally unwanted overlapped image composed of more than one profile line. Using a filter tuned to the light source frequency or other optical means such as masking, only the profile line of the object being illuminated is captured onto the area sensor in the present invention. The only limitation of the present method is that consecutive profile lines captured during the same frame period do not overlap. In some particular conditions, even overlapped profiles may be isolated by computer calculation.

According to this invention, there is provided a high-speed imaging system which uses an interline transfer charge-coupled device CCD sensor having n horizontal pixel lines, a TR image transfer signal input and a line or vertical transfer signal input. The CCD sensor is arranged to receive profile line images having an essentially dark background and it includes an image acquisition control circuit which comprises first, a vertical transfer signal generator means for generating a signal for the vertical transfer input having a frequency $f_L$ of n times per frame period and second, a TR signal generator means for generating an output signal TR having a frequency $f_{TR}$, for the TR image transfer signal input, wherein the $f_{TR}$ frequency is greater than $1/n*f_L$, in order to capture more than one profile image per frame period.

It is accordingly an object of this invention to provide a method of driving an interline transfer type CCD sensor is disclosed, where the CCD sensor has n horizontal pixel lines, a TR image transfer signal input and a line or vertical transfer signal input. The mentioned method comprises the essential steps of (1) generating an output signal of frequency $f_L$ of n times per frame period for the vertical transfer signal input in order to transfer CCD vertical shift register charges, one line at a time, into a horizontal shift register and (2), generating an output signal TR having a frequency $f_{TR}$, for the TR image transfer signal input, wherein the $f_{TR}$ frequency is greater than $1n/*f_L$, in order to capture more than one profile image per frame period.

The invention further provides a method of inspecting an object using high speed profiling comprising: projecting light in a plane onto the object to create a profile line on the object; arranging a camera system including an interline transfer charge-coupled device (CCD) sensor to obtain a profile line image of the object, wherein the profile line image appears within a substantially dark background and extends substantially along a horizontal direction of the CCD sensor, the CCD sensor having horizontal lines that are vertically transferred to output its image data; and controlling the CCD sensor's image transfer rate to capture more than one profile image per frame period. Preferably, many profile line images are captured per frame period. The number of images captured per frame period depends on the vertical dimensions of the CCD sensor being used, the required exposure or image acquisition time, and rate of variation or charge in the profile line shape.

According to another aspect of the invention, there is provided a high speed profiling image system and method using a frame transfer charge-coupled device (CCD) sensor. The sensor has n horizontal pixel lines in an exposed image area, a protected area, a line shift transfer mechanism for transferring lines from the exposed area into the protected area, and a read-out mechanism for reading out image data from the protected area. The CCD sensor is arranged to receive substantially horizontal profile line images in an essentially dark background. Accordingly to the invention, the system includes an image acquisition control circuit comprising a frame transfer controller generating a shift control signal for the line shift transfer mechanism to cause a rapid transfer of m lines from the exposed area into the protected area, and for pausing the generating of the shift control signal to allow for image acquisition of the profile line image, wherein m is less than the n horizontal pixel lines, the frame transfer controller causing the transfer of m to provide more than one profile image per frame period, and a read-out controller generating a read-out shift control signal for the read-out mechanism, the read-out controller reading out m lines during the pausing and then pausing until the transfer of the m lines from the image area is completed by the frame transfer controller.

Preferably, the frame transfer controller further controls a light source to turn it off during the transfer of m lines to the protected area and to turn it on during the image acquisition pausing. Also, a user interface device may be connected to the frame transfer controller and the read-out controller for selecting a value of m and a time period for the image acquisition pausing. An automatic adjusting mechanism may also be connected to the frame transfer controller and the read-out controller for selecting a value of m and a time period for the image acquisition pausing depending on an input signal representing a minimum spacing between two of the profile line images.

BRIEF DESCRIPTION OF THE DRAWINGS

This invention may be better understood and its objects and advantages will become apparent to those skilled in art by reference to the accompanying drawings, in which:

FIG. 7 shows the camera controller and the CCD camera of the present invention, where automatic frequency regulator is included for $f_{TR}$ frequency; and FIG. 8 shows a frame transfer type CCD array of the improved technique presented by the present invention wherein the frame transfer CCD exposes the image and then clocks the entire exposed image area shifting it at high speed line by line into the protected area.

DESCRIPTION OF THE PREFERRED EMBODIMENTS

While the general principle of operation of an interline transfer type CCD area sensor has been described above, it is helpful for purpose of understanding the present invention to re-examine the general mechanism of a charge-coupled device camera and particularly the method employed in such an apparatus in order to transfer the accumulated charges from the photosites into the vertical shift register.

Figure 2:
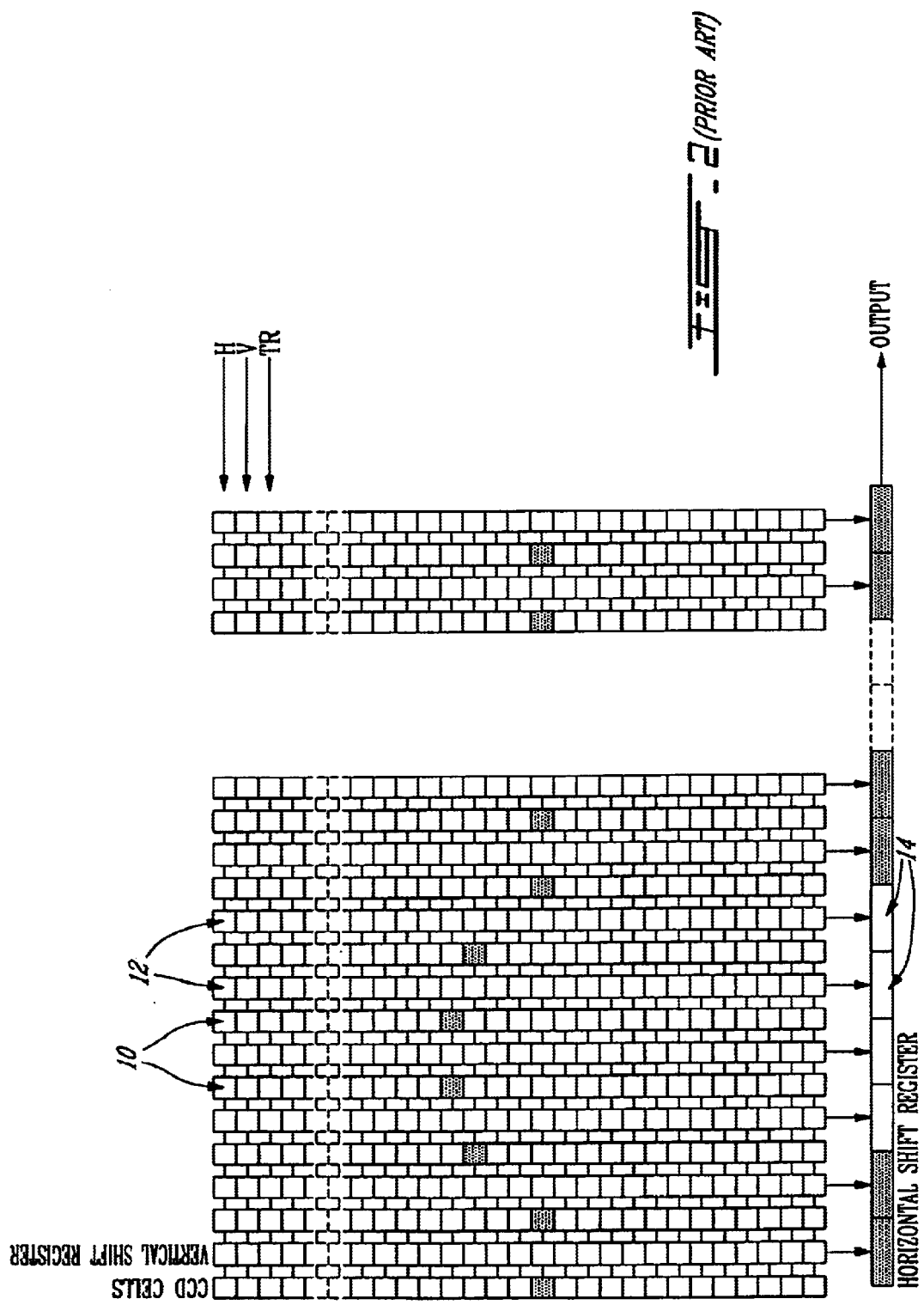
FIG. 2 shows an interline transfer type CCD array as known in the prior art.

As explained before, an interline transfer CCD image sensor as the one shown in FIG. 2 comprises light-sensitive elements or photosites designated by 10, which are arranged in rows and columns forming a matrix form. Each photosite 10 performs a transformation of the incident light into electrical charges which are then accumulated inside the said photosites. The output of each of these cells connects to its corresponding cell of one or more vertical shift registers 12 which are hidden from light exposition by a shield and which are used for temporary storage of the electrical charges representing the acquired image, before forming a final video line. The horizontal transfer of the photosites accumulated electrical charges into the vertical shift register 12, is controlled by an electrical signal called TR of frequency $f_{TR}$, which is triggered at the end of each video sequence in order to start the acquisition of the next frame by transferring the electrical charges from the exposed photosites 10 into the vertical shift register 12.

Following this horizontal transfer, the charges shifted inside the vertical register 12 correspond to the image previously acquired. At the clock signal V of frequency $f_L$, the vertical shift register charges are downloaded, one line at a time, into the horizontal shift register cells 14, as shown by the vertical arrows at the bottom of FIG. 2. The charges contained in that horizontal register 14 now from a final video line, which is output to an electronic video processing circuit following the horizontal output arrows on the FIG. 2, according to a signal clock H of frequency $f_P$, and all of the video lines, when shifted out sequentially, forms the complete video frame.

As explained before, such a CCD image sensor can also be used for geometry inspection and object profiling and in these particular cases the final image captured by the CCD camera is composed of a profile line of the observed object.

Figure 1:
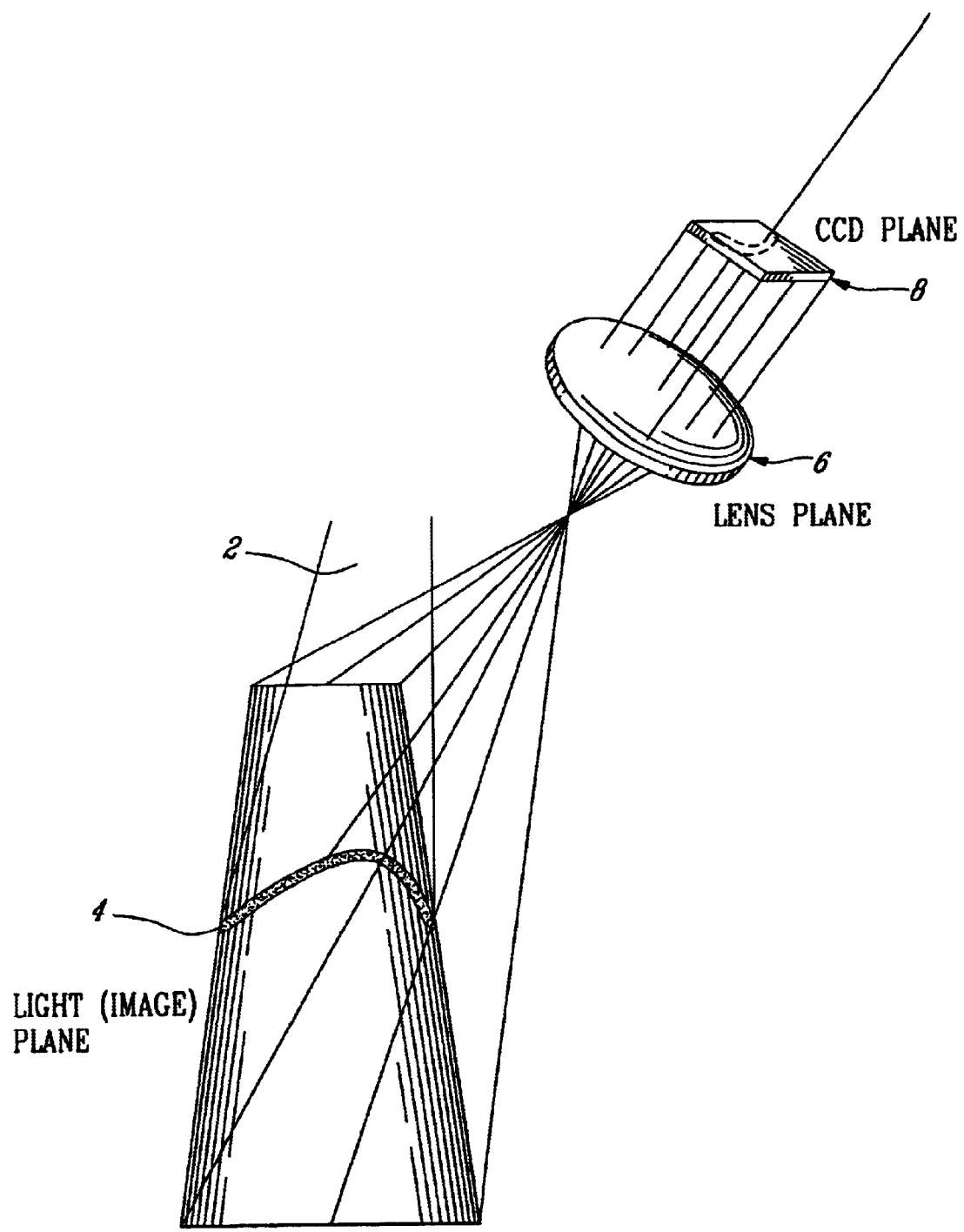
FIG. 1 shows a typical prior art apparatus arrangement for surface profiling measuring using a light plane projected on the object profiled and captures throughout a lens plane on the CCD plane.

A typical apparatus arrangement for surface profile measuring is shown in FIG. 1. An high intensity light plane designated by 2, coming from a laser, is projected over the object being inspected and the reflected bright light line 4 resulting from the intersection of the light plane 2 with the object surface is collected via a lens 6 on the CCD sensor array 8. Other optical means such masking, or a filter turned to the light frequency may be used in order to isolate that bright line from adjacent reflections or from other light coming from other sources which could interfere with the main light line.

In that particular application, the result of using the prior art technique of triggering the TR signal only once per frame is that every image captured on the CCD array sensor contains only a single profile line. The disadvantage of this prior art technique is that when its is used for high speed object profiling, such as on an assembly line, acquiring a single profile per frame is no more sufficient because of the prior art frame acquisition rate which is of only 30 frame per second. In that case, the frame period, which is the time interval required to form a complete image and which corresponds in the prior art technique to the time comprised between two consecutive non-null values of the TR control signal, is about 1/30 of a second, so no more than about 30 objects parts can be inspected during the same period.

Figure 3:
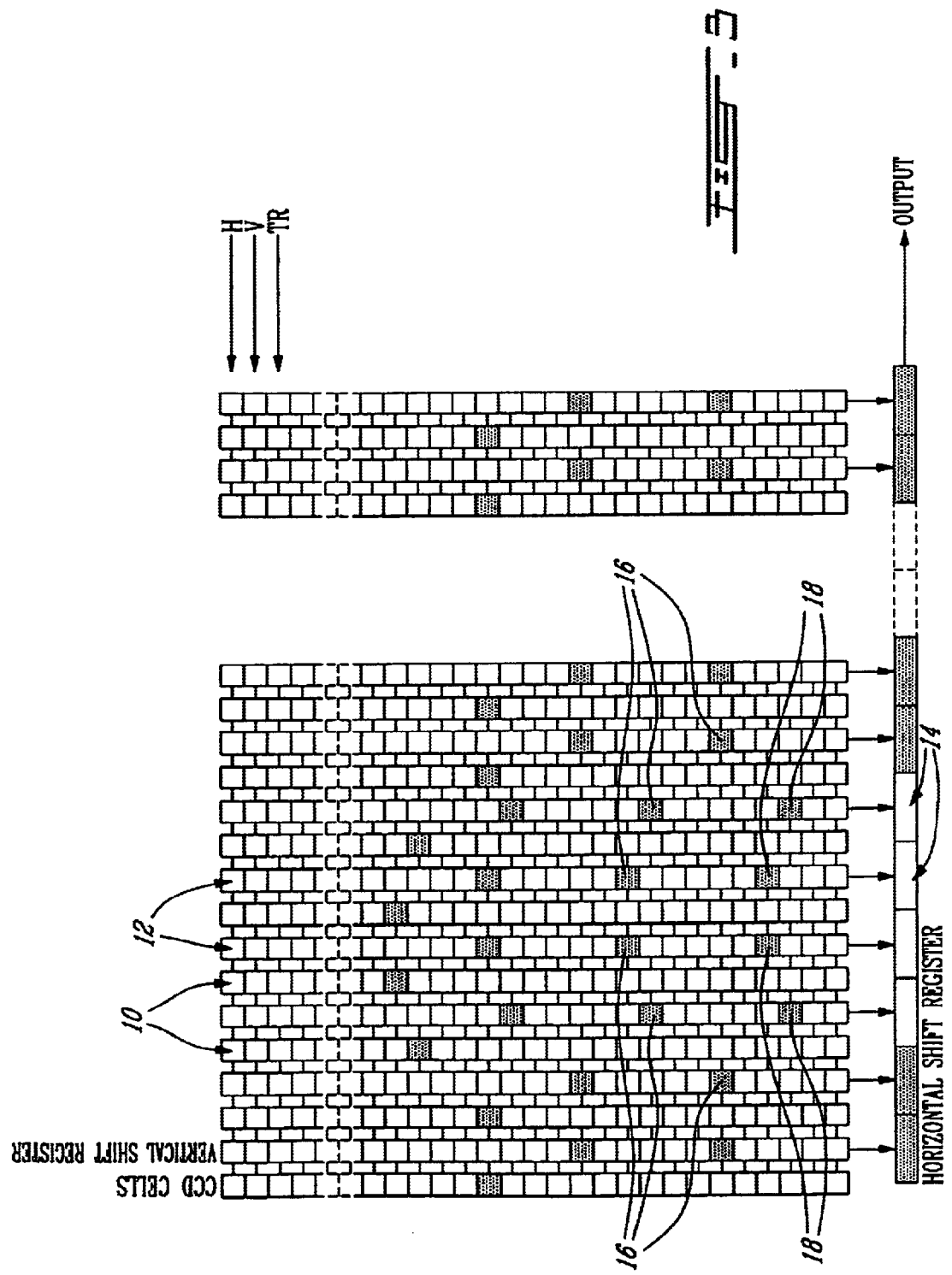
FIG. 3 shows the interline transfer type CCD array of the improved technique presented by the present invention wherein the TR control signal has been triggered more than once per frame period so multiple profile lines have been acquired onto the CCD sensor.

The preferred embodiment of the present invention is related to the technique of transferring the electrical charges from the photosites 10 into the vertical shift register 12 of a CCD image sensor. Instead of triggering the transfer control signal TR only once per frame period as in the prior art method, a preferred embodiment of this invention is a technique that permits triggering the TR signal a much greater number of times during the same image composing period. Each time the TR control signal is triggered, the accumulated electrical charges are shifted from the light-sensitive cells 10 into their corresponding vertical shift register cells 12, and added to any prior shifted charges, that got a few vertical pixel lines closer to the horizontal shift register 14 by this time, as shown in FIG. 3. In this way another acquired profile line image 16 is transferred over the prior acquired profile line image 18, before that prior image 18 has left the vertical shift register 12 as was done in the prior art method. It is important that the CCD camera is configured not to expunge the prior shifted electrical charges from the vertical register cells 12, at the time of the transfer of the new charges from the photosites 10 into the vertical register cells 12. Therefore, the result of the transfer would normally be an unwanted overlapped image. But since, first, the vertical shift register 12 is also downloaded line by line into the horizontal shift register 14 with a frequency $f_L$, wherein $1/n*f_L$ is less than the TR control signal frequency $f_{TR}$, as shown by the vertical arrows in FIG. 3, and since, second, the acquired image is a very thin and bright profile line which is substantially horizontal, this profile line will not overlap with the prior captured profile line, because the prior electrical charges corresponding to the prior line will already by moved a few pixel lines closer to the horizontal shift register 14 (or lower, as shown in FIG. 3) by the time the new charges are shifted from the photosites 10 into the vertical shift register cells 12.

Figure 4:
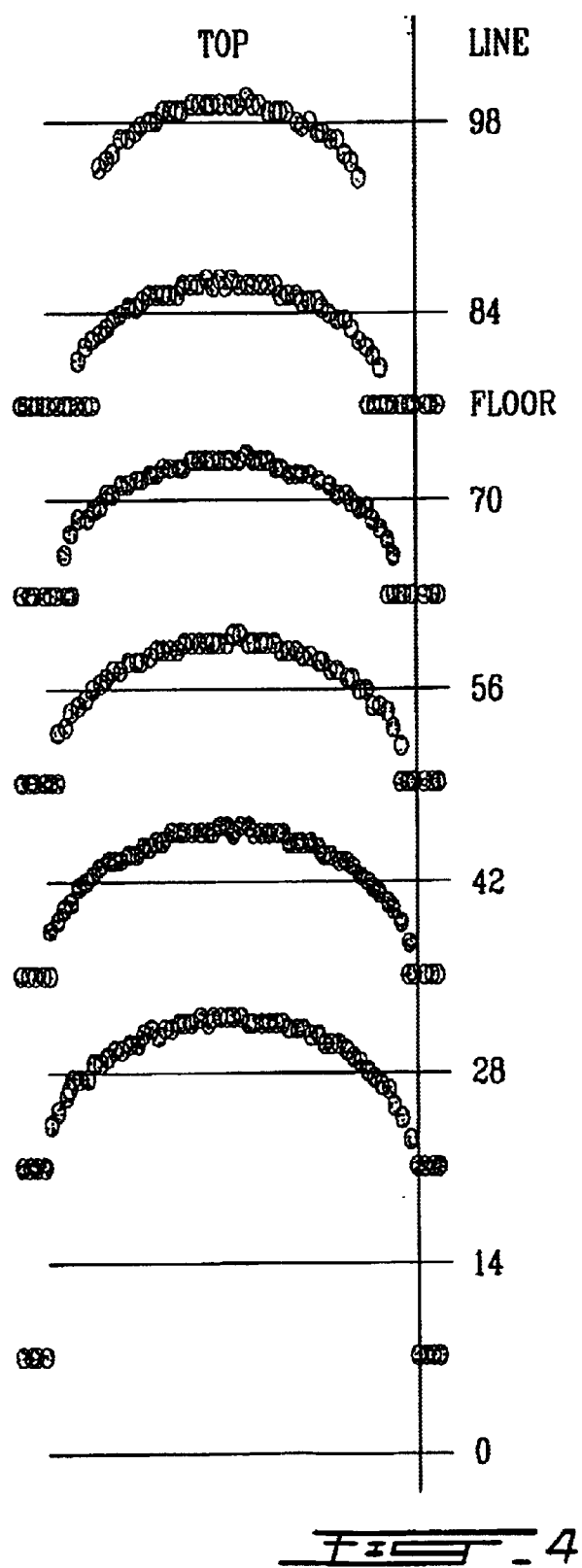
FIG. 4 illustrates an example of image where consecutive profiles of spherical object (a ball) optically overlap but which are separated using computerized image processing.
Figure 5:
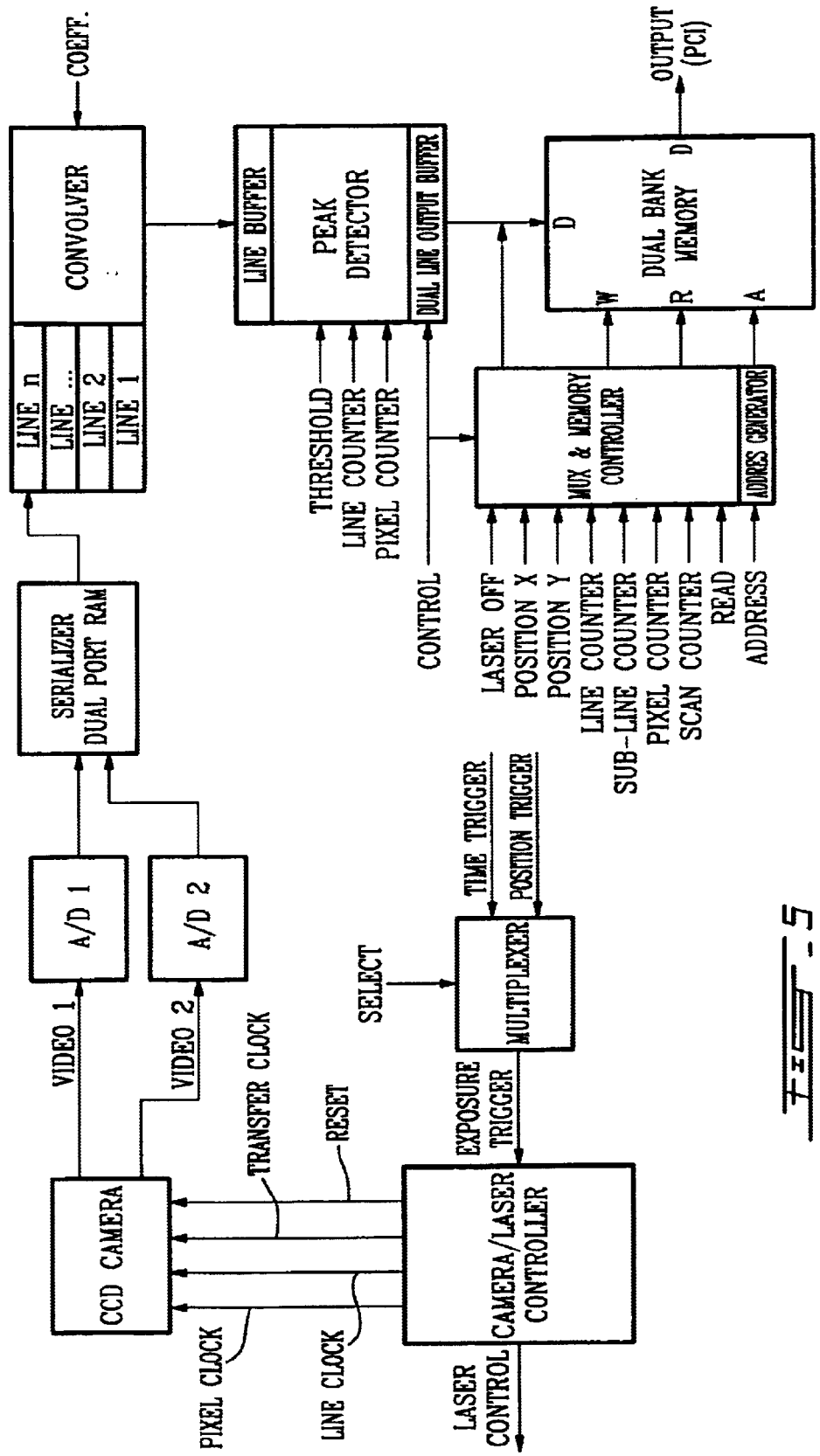
FIG. 5 shows a block diagram representing the complete electronic circuit comprising the main devices employed in order to control the CCD camera and to perform video processing.

For example, when using a CCD area sensor of 1024 pixels wide by 766 pixels high, even if the TR signal is triggered 50 times per frame period which results in 50 bright profile lines on each image of 768 pixels high, that still allows about 15 vertical pixels separation between 2 consecutive profile lines, as shown in FIG. 4, providing that a profile line's width is substantially narrower than 15 pixels. For a frame rate of 30 Hz, the TR signal frequency will be of 1500 Hz which is, for most applications a very fast image acquisition rate. As will be appreciated, the lines are substantially horizontal meaning that any deviations from a horizontal baseline in the profile images result in no image overlap or an acceptable amount of image overlap in the acquired profile line images obtained according to the invention.

The main application of this technique is to capture very bright profile lines on an essentially dark background. In such case, which is used for geometry inspection and object profiling, a photosite charge level of a cell corresponding to a part of the bright profile line, will only change a little or will not change at all during the addition process over the prior shifted charge from the photo-sensitive cell 10 into the vertical shift register cell 12, since this previously acquired charge corresponds to an upper dark area of the image which corresponds in electrical terms to very low or even to a null electrical charge level (see FIG. 4). This particular condition of operation on a dark background allows easier separation of consecutive bright profile lines which can now be read at a much greater speed than in the prior art.

The present invention provides an improvement over the prior art frame acquisition by up to a factor of 50, depending on the thickness of the acquired image. The limitations of the technique according to the invention are the image accuracy and definition wanted for a particular image, or not overlapping consecutive profiles. In that later case, it is possible that for certain surfaces having generally known characteristics, it would even be possible to separate consecutive overlapped profiles using a known surface model and computer calculation. FIG. 4 shows such a situation, where the profiles are obtained by scanning a known diameter ball sitting on a flat surface, and where the round ball profiles have been separated from the flat surface of the floor using algorithms that calculate curvatures from neighboring profile points. Then, knowing the nominal ball diameter it is easy to pair corresponding floor and ball too profiles.

In the preferred embodiments of this technique, high-speed, progressive scan, interline transfer, multiple tap CCDs are used such as the TV format CCD having 694 by 496 lines such as the KODAK KAI-0310M camera or the HDTV format 1948 pixels by 1092 lines image sensors such as the KODAK KAI-2090M camera. Other interline transfer CCDs from other manufacturers are suitable as well.

In another embodiment of the present invention, multiple sensors or CCD combinations may be used to either increase speed or acquire a particular geometry of the observed object. For example, putting two CCD cameras one on each side of the laser plane can increase scanning speed and at the same time provide means to avoid some occlusion problems like when mapping two sides of a steep pyramid. Side by side camera combination can increase the scanning width and also preserve vertical resolution.

In another embodiment of the present invention, the triggering method can be used to capture other high aspect ratio (width/height) images, which are not profile lines but have a non-negligible thickness, onto the CCD sensor one above the other, under normal lighting conditions, by positioning an optical means such as appropriate slot in the front of the CCD sensor such as only n lines of the CCD array are exposed to the light. In this case, a new exposure can occur after each shift of n lines, by triggering the TR signal, which results in much higher image rate output. This embodiment is useful for high speed event recording.

Figure 6:
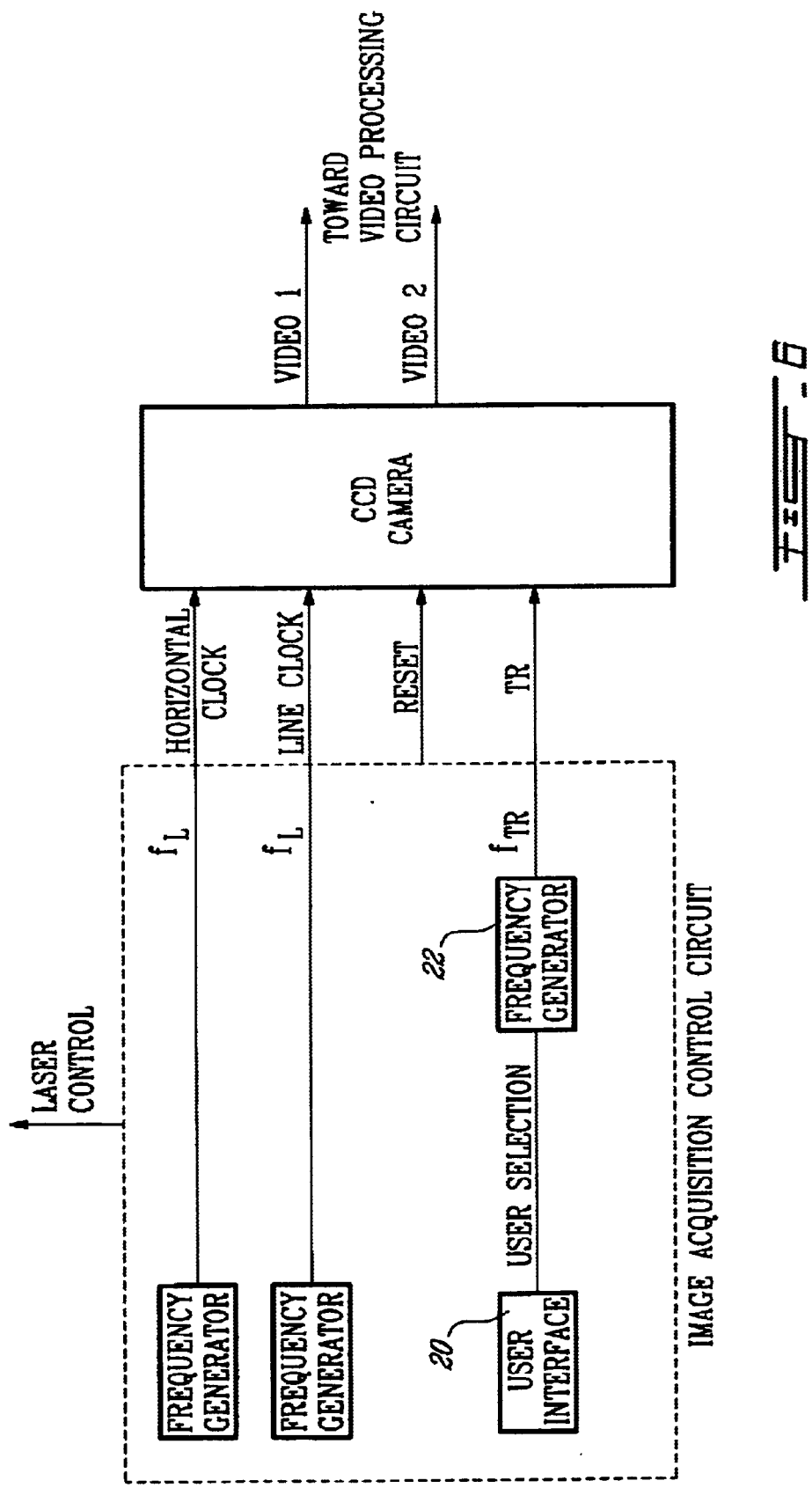
FIG. 6 shows the camera controller and the CCD camera of the present invention, where the $f_{TR}$ frequency is controlled by the user via the user interface.

Another embodiment of the invention relates to the electronic circuit used with the present technique in order to control the TR control signal frequency and allow the capture of as many profile lines as wanted during the same frame period. FIG. 6 shows a block diagram of this preferred embodiment. The user interface block comprises any devices which may be used to select the TR signal frequency, in order to control the number of profile lines x that will be captured on the same frame. This numerical value, noted x, may range from 1, which corresponds to the standard read rate of the prior art, to 50 or more, depending of the vertical resolution of the CCD array and of the thickness of the image being acquired. Therewith, the user selection is send into a frequency generator 22, which converts the received user control signal into a signal of particular frequency $f_{TR}$, greater than the frame rate, that allows the selected number of profile lines x to be captured in the same frame. The said camera controller outputs the vertical clock signal and the horizontal clock signal, having respective frequencies $f_L$ and $f_P$. Since the TR frequency is greater than the frame rate, the TR signal is triggered more than once per frame period which results in having more than one profile line being captured on the same frame.

Another embodiment of the present invention relates to an automatic means for controlling the TR signal frequency. Instead of having the user to control that frequency in order to get the optimum acquisition rate, this embodiment introduce an image analyzer 30, as shown in FIG. 7, capturing the video image output by the CCD camera, and processing the said image in order to result a value corresponding to the minimum spacing between two consecutive profile lines. This value is then used to control the TR frequency regulator 32 in order to allow the TR frequency regulator 32 to output the highest TR frequency possible without overlapping profile lines. The video output in the systems shown in FIGS. 6 and 7 have a dual output CCD camera, namely two lines of the CCD are output together (Video 1 and Video 2), and thus the image transfer rate is doubled. Such multiple line CCD cameras are known in the art.

Also according to the invention, a frame transfer CCD (FIG. 8) can be used. The frame transfer CCD exposes the image and then clocks the entire exposed image area shifting it at high speed line by line into the protected area. The protected or output area has its own clocks to shift the image information line by line into the output register and shift the information out of the output register pixel by pixel.

To operate such CCD to achieve the same effect as described for the interline transfer CCD, the CCD should be exposed for m line periods after which the laser (or other illumination source) is preferably turned off and the parallel transfer of m lines is executed. During the exposure time, the read-out circuitry reads out the m lines. The exposure time may be greater than this read-out time, however, for optimum performance, it should be as close as possible. When m is equal the total number of CCD lines n, the above describes the normal operation. By selecting m smaller than the total number of lines n, a partial frame transfer will be executed resulting in multiple exposures as with the interline transfer CCD.

A disadvantage of using a frame transfer CCD is some smearing, and thus the need to turn off the laser during the parallel transfer to avoid any possible unmanageable smearing. An advantage is higher sensitivity due to larger active area per pixel since no separate shift registers exist.

As in the preferred embodiment, control over the parameters of m and the exposure time can be set by the operator or automatically determined.

Although the invention has been described above with reference to a preferred embodiment and alternative embodiments, it is to be understood that the above description is intended merely to illustrate the invention and not to limit the scope of the invention as defined in the appended claims.

I claim:

1. A high speed profiling imaging system using a frame transfer charge-coupled device (CCD) sensor having n horizontal pixel lines in an exposed image area, a protected area, a line shift transfer mechanism for transferring lines from said exposed image area into said protected area, and a read-out mechanism for reading out image data from said protected area, said CCD sensor being arranged to receive substantially horizontal profile line images in an essentially dark background, said system including an image acquisition control circuit comprising:

a frame transfer controller generating a shift control signal for said line shift transfer mechanism to cause a rapid transfer of m lines from said exposed image area into said protected area, and for causing image acquisition pausing involving pausing said generating of said shift control signal to allow for image acquisition of said profile line images, wherein m is less than said n horizontal pixel lines, said frame transfer controller causing said transfer of m lines to provide more than one profile image per frame period; and a read-out controller generating a read-out shift control signal for said read-out mechanism, said read-out controller reading out of said m lines during said pausing and then pausing until said transfer of said m lines from said exposed image area is completed by said frame transfer controller.

2. A high speed profiling imaging system as defined in claim 1, further comprising a light source for projecting light onto an object to create said profile line images thereon, said frame transfer controller further controlling said light source to turn it off during transfer of m lines to said protected area and to turn it on during said image acquisition pausing.

3. A high speed profiling image system as defined in claim 2, during comprising a user interface device connected to said frame transfer controller and said read-out controller for selecting a value of m and a time period for said image acquisition pausing.

4. A high speed profiling image system as defined in claim 2, further comprising an automatic adjusting mechanism connected to said frame transfer controller and said read-out controller for selecting a value of m and a time period of said image acquisition pausing depending on an input signal representing a minimum spacing between two of said profile line images.

5. A high speed profiling imaging system as defined in claim 1, further comprising a user interface device connected to said frame transfer controller and said read-out controller for selecting a value of m and a time period for said image acquisition pausing.

6. A high speed profiling imaging system as defined in claim 1, further comprising an automatic adjusting mechanism connected to said frame transfer controller and said read-out controller for selecting a value of m and a time period for said image acquisition pausing depending on an input signal representing a minimum spacing between two of said profile line images.

7. A high speed profiling imaging system as defined in claim 1, wherein a time period for said image acquisition pausing is less than a minimum time required to read-out n lines from said protected area by said read-out mechanism.

8. A high speed profiling imaging system as defined in claim 7, wherein said time period is between 10 to 50 times less than said minimum time required.

9. A high speed profiling image system as defined in claim 2, wherein a time period for said image acquisition pausing is less than a minimum time required to read-out n lines from said protected area by said read-out mechanism.

10. A high speed profiling imaging system as defined in claim 9, wherein said time period is between 10 to 50 times less than said minimum time required.

11. A high speed profiling imaging system as defined in claim 3, wherein said time period for said image acquisition pausing is less than a minimum time required to read-out n lines from said protected area by said read-out mechanism.

12. A high speed profiling system as defined in claim 11, wherein said time period is between 10 to 50 times less than said minimum time required.

13. A high speed profiling imaging system as defined in claim 4, wherein said time period for said image acquisition pausing is less than a minimum time required to read-out n lines from said protected area by said read-out mechanism.

14. A high speed profiling system as defined in claim 13, wherein said time period is between 10 to 50 times less than said minimum time required.

15. A high speed profiling imaging system as defined in claim 1, further comprising an optical means for masking a part of said CCD sensor on which no part of said profile line images is to be captured, to eliminate any incident light on said masked part of said CCD sensor which is not used for image acquisition, in order to improve an accuracy of said profile line images, wherein a shape of said masked part of the CCD sensor depends of a maximum shape variation of said profile line images being acquired.

* * * * *